US009235837B2

(12) United States Patent
Ueda

(10) Patent No.: US 9,235,837 B2
(45) Date of Patent: Jan. 12, 2016

(54) LOG INFORMATION MANAGEMENT APPARATUS FOR IMAGE FORMING APPARATUS, WHICH MANAGES JOB HISTORY PERFORMED BY USER

(75) Inventor: Takashi Ueda, Kashiba (JP)

(73) Assignee: Konica Minolta Business Technologies, Inc., Chiyoda-ku, Tokyo (JP)

( * ) Notice: Subject to any disclaimer, the term of this patent is extended or adjusted under 35 U.S.C. 154(b) by 1102 days.

(21) Appl. No.: 13/271,637

(22) Filed: Oct. 12, 2011

(65) Prior Publication Data

US 2012/0099136 A1 Apr. 26, 2012

(30) Foreign Application Priority Data

Oct. 26, 2010 (JP) ................................. 2010-239853

(51) Int. Cl.
*G06Q 20/34* (2012.01)
*G07F 7/02* (2006.01)
*G07F 17/26* (2006.01)
*H04N 1/00* (2006.01)
*H04N 1/32* (2006.01)
*H04N 1/34* (2006.01)

(52) U.S. Cl.
CPC ............... *G06Q 20/346* (2013.01); *G07F 7/02* (2013.01); *G07F 17/266* (2013.01); *H04N 1/00339* (2013.01); *H04N 1/00832* (2013.01); *H04N 1/32122* (2013.01); *H04N 1/34* (2013.01); *H04N 2201/0094* (2013.01); *H04N 2201/3202* (2013.01); *H04N 2201/3205* (2013.01); *H04N 2201/3214* (2013.01); *H04N 2201/3215* (2013.01); *H04N 2201/3216* (2013.01);

(Continued)

(58) Field of Classification Search
CPC .................. H04N 1/32122; H04N 2201/3215; H04N 2201/3274; H04N 2201/3214; H04N 2201/3205; H04N 2201/3202
USPC ............ 358/1.15, 1.16; 707/661, 672; 399/79
See application file for complete search history.

(56) References Cited

U.S. PATENT DOCUMENTS 8,215,548 B2 * 7/2012 Gnanasambandam et al. .............................. 235/383
2007/0127061 A1 * 6/2007 Itagaki ......................... 358/1.15

(Continued)

FOREIGN PATENT DOCUMENTS

JP 2003-280468 A 10/2003
JP 2006-172074 A 6/2006

(Continued)

OTHER PUBLICATIONS

Office Action (Notice of Grounds of Rejection) dated Oct. 16, 2012, issued in corresponding Japanese Patent Application No. 2010-239853, and an English Translation of the Office Action. (6 pages).

*Primary Examiner* — Jamares Q Washington
(74) *Attorney, Agent, or Firm* — Buchanan Ingersoll & Rooney PC

(57) ABSTRACT

A log information management apparatus acquires a card ID from an IC card to set a remaining processing flag to the IC card. The log information management apparatus determines whether the remaining processing flag is set to the IC card before the remaining processing flag is set after the card ID is acquired. The log information management apparatus cause an image forming apparatus to perform a job, and causes a storage device to store a job history based on completion of the performance of the job. The log information management apparatus writes a job history relating to the card ID in the IC card in which the remaining processing flag is determined to be set. The log information management apparatus releases the remaining processing flag after writing the job history.

11 Claims, 21 Drawing Sheets

(52) U.S. Cl.
CPC *H04N2201/3223* (2013.01); *H04N 2201/3274* (2013.01)

(56) References Cited

U.S. PATENT DOCUMENTS

2009/0070264 A1* 3/2009 Buck et al. ................ 705/44
2009/0109462 A1* 4/2009 Hiruma ................ G06Q 30/04
                                                    358/1.13
2010/0067046 A1* 3/2010 Tsukada et al. ............. 358/1.15
2011/0063651 A1* 3/2011 Ehara ......................... 358/1.14

FOREIGN PATENT DOCUMENTS

| JP | 2007-026114 A | 2/2007 |
| JP | 2009-134538 A | 6/2009 |

\* cited by examiner

FIG.4

CARD STORAGE INFORMATION

| CARD ID |
|---|
| 12345678 |

| LOGIN TIME | JOB PERFORMANCE TIME | JOB CONTENT | USAGE CHARGE | BALANCE | REMAINING PROCESSING FLAG |
|---|---|---|---|---|---|
| 2010/02/22 11:30:10 | 2010/02/22 11:30:31 | FAX, 4 pages, A4 size | 100 YEN | 2610 YEN | |
| 2010/02/22 09:40:02 | 2010/02/22 09:40:59 | Send e-mail to ueda@mol.. | 50 YEN | 2710 YEN | |
| 2010/02/22 09:28:54 | 2010/02/22 09:33:32 | Black-and-white print, 4 sheets, A4 size | 40 YEN | 2760 YEN | |
| 2010/02/22 09:28:54 | 2010/02/22 09:31:02 | Black-and-white print, 6 sheets, A4 size | 60 YEN | 2800 YEN | |
| ... | ... | ... | ... | ... | |

FIG.5

LOG INFORMATION TABLE

| USER NAME | CARD ID | LOGIN TIME | JOB PERFORMANCE TIME | JOB CONTENT | LOGIN RESULT | USAGE CHARGE |
|---|---|---|---|---|---|---|
| B555 | 87918745 | 2010/02/28 13:40:01 | 2010/02/28 11:49:49 | Send e-mail to kiota@mol... | OK | 50 YEN |
| ABCD | 12345678 | 2010/02/28 13:12:35 | 2010/02/28 13:14:30 | FAX, 21 pages, A4 size | OK | 200 YEN |
| B555 | 87918745 | 2010/02/28 11:40:01 | 2010/02/28 11:40:24 | FAX, 4 pages, A4 size | OK | 100 YEN |
| B555 | 87918745 | 2010/02/28 11:40:01 | 2010/02/28 11:45:14 | Black-and-white print, 4 sheets, A4 size | OK | 40 YEN |
| B298 | 45671258 | 2010/02/28 09:40:59 | 2010/02/28 09:41:55 | Send e-mail to ueda@mol... | OK | 50 YEN |
| S973 | 10156578 | 2010/02/28 09:33:32 | 2010/02/28 09:34:47 | Black-and-white print, 4 sheets, A4 size | OK | 40 YEN |
| D338 | 57687778 | 2010/02/28 09:31:02 | 2010/02/28 09:32:01 | Black-and-white print, 4 sheets, A4 size | NG | 0 YEN |
| A981 | 02111478 | 2010/02/28 08:50:01 | 2010/02/28 08:52:11 | Color print, 4 sheets, A4 size | OK | 400 YEN |
| C837 | 35468450 | 2010/02/27 21:05:56 | 2010/02/27 21:07:16 | Black-and-white print, 4 sheets, A3 size | OK | 80 YEN |
| ... | ... | ... | ... | ... | ... | ... |

FIG.6

ID INFORMATION TABLE

| CARD ID | USER NAME | USAGE OF MFP |
|---|---|---|
| 12345678 | ABCD | OK |
| 02111478 | A981 | OK |
| 32465784 | A815 | NO |
| ... | ... | ... |

FIG.8

CARD STORAGE INFORMATION

| CARD ID | | | | |
|---|---|---|---|---|
| 12345678 | | | | |

| LOGIN TIME | JOB PERFORMANCE TIME | JOB CONTENT | USAGE CHARGE | BALANCE | REMAINING PROCESSING FLAG |
|---|---|---|---|---|---|
| 2010/02/22 11:30:10 | 2010/02/22 11:30:31 | FAX, 4 pages, A4 size | 100 YEN | 2610 YEN | SET |
| 2010/02/22 09:40:02 | 2010/02/22 09:40:59 | Send e-mail to ueda@mol.. | 50 YEN | 2710 YEN | |
| 2010/02/22 09:28:54 | 2010/02/22 09:33:32 | Black-and-white print, 4 sheets, A4 size | 40 YEN | 2760 YEN | |
| 2010/02/22 09:28:54 | 2010/02/22 09:31:02 | Black-and-white print, 6 sheets, A4 size | 60 YEN | 2800 YEN | |
| ... | ... | ... | ... | ... | |

FIG.9

CARD STORAGE INFORMATION

| CARD ID | | | | | |
|---|---|---|---|---|---|
| 12345678 | | | | | |
| LOGIN TIME | JOB PERFORMANCE TIME | JOB CONTENT | USAGE CHARGE | BALANCE | REMAINING PROCESSING FLAG |
| 2010/02/28 13:12:35 | 2010/02/28 13:14:30 | FAX, 21 pages, A4 size | 200 YEN | 2410 YEN | |
| 2010/02/22 11:30:10 | 2010/02/22 11:30:31 | FAX, 4 pages, A4 size | 100 YEN | 2610 YEN | |
| 2010/02/22 09:40:02 | 2010/02/22 09:40:59 | Send e-mail to ueda@mol.. | 50 YEN | 2710 YEN | |
| 2010/02/22 09:28:54 | 2010/02/22 09:33:32 | Black-and-white print, 4 sheets, A4 size | 40 YEN | 2760 YEN | |
| 2010/02/22 09:28:54 | 2010/02/22 09:31:02 | Black-and-white print, 6 sheets, A4 size | 60 YEN | 2800 YEN | |
| ... | ... | ... | ... | ... | |

FIG.10

LOG INFORMATION TABLE

| USER NAME | CARD ID | LOGIN TIME | JOB PERFORMANCE TIME | JOB CONTENT | LOGIN RESULT | USAGE CHARGE |
|---|---|---|---|---|---|---|
| B555 | 87918745 | 2010/02/28 13:40:01 | 2010/02/28 11:49:49 | Send e-mail to kiota@mol... | OK | 50 YEN |
| B555 | 87918745 | 2010/02/28 11:40:01 | 2010/02/28 11:40:24 | FAX, 4 pages, A4 size | OK | 100 YEN |
| B555 | 87918745 | 2010/02/28 11:40:01 | 2010/02/28 11:45:14 | Black-and-white print, 4 sheets, A4 size | OK | 40 YEN |
| B298 | 45671258 | 2010/02/28 09:40:59 | 2010/02/28 09:41:55 | Send e-mail to ueda@mol... | OK | 50 YEN |
| S973 | 10156578 | 2010/02/28 09:33:32 | 2010/02/28 09:34:47 | Black-and-white print, 4 sheets, A4 size | OK | 40 YEN |
| D338 | 57687778 | 2010/02/28 09:31:02 | 2010/02/28 09:32:01 | Black-and-white print, 4 sheets, A4 size | NG | 0 YEN |
| A981 | 02111478 | 2010/02/28 08:50:01 | 2010/02/28 08:52:11 | Color print, 4 sheets, A4 size | OK | 400 YEN |
| C837 | 35468450 | 2010/02/27 21:05:56 | 2010/02/27 21:07:16 | Black-and-white print, 4 sheets, A3 size | OK | 80 YEN |
| ... | ... | ... | ... | ... | ... | ... |

FIG.11

CARD STORAGE INFORMATION

| CARD ID |  |  |  |  |  |
|---|---|---|---|---|---|
| 12345678 |  |  |  |  |  |

| LOGIN TIME | JOB PERFORMANCE TIME | JOB CONTENT | USAGE CHARGE | BALANCE | REMAINING PROCESSING FLAG |
|---|---|---|---|---|---|
| 2010/02/28 13:12:35 | 2010/02/28 13:14:30 | FAX, 21 pages, A4 size | 200 YEN | 2410 YEN | SET |
| 2010/02/22 11:30:10 | 2010/02/22 11:30:31 | FAX, 4 pages, A4 size | 100 YEN | 2610 YEN |  |
| 2010/02/22 09:40:02 | 2010/02/22 09:40:59 | Send e-mail to ueda@mol.. | 50 YEN | 2710 YEN |  |
| 2010/02/22 09:28:54 | 2010/02/22 09:33:32 | Black-and-white print, 4 sheets, A4 size | 40 YEN | 2760 YEN |  |
| 2010/02/22 09:28:54 | 2010/02/22 09:31:02 | Black-and-white print, 6 sheets, A4 size | 60 YEN | 2800 YEN |  |
| ... | ... | ... | ... | ... |  |

FIG.12

LOG INFORMATION TABLE

| USER NAME | CARD ID | LOGIN TIME | JOB PERFORMANCE TIME | JOB CONTENT | LOGIN RESULT | USAGE CHARGE |
|---|---|---|---|---|---|---|
| ABCD | 12345678 | 2010/02/28 17:25:31 | 2010/02/28 17:26:02 | Black-and-white print, 8 sheets, A4 size | OK | 80 YEN |
| B555 | 87918745 | 2010/02/28 13:40:01 | 2010/02/28 11:49:49 | Send e-mail to kiota@mol... | OK | 50 YEN |
| B555 | 87918745 | 2010/02/28 11:40:01 | 2010/02/28 11:40:24 | FAX, 4 pages, A4 size | OK | 100 YEN |
| B555 | 87918745 | 2010/02/28 11:40:01 | 2010/02/28 11:45:14 | Black-and-white print, 4 sheets, A4 size | OK | 40 YEN |
| B298 | 45671258 | 2010/02/28 09:40:59 | 2010/02/28 09:41:55 | Send e-mail to ueda@mol... | OK | 50 YEN |
| S973 | 10156578 | 2010/02/28 09:33:32 | 2010/02/28 09:34:47 | Black-and-white print, 4 sheets, A4 size | OK | 40 YEN |
| D338 | 576877778 | 2010/02/28 09:31:02 | 2010/02/28 09:32:01 | Black-and-white print, 4 sheets, A4 size | NG | 0 YEN |
| A981 | 02111478 | 2010/02/28 08:50:01 | 2010/02/28 08:52:11 | Color print, 4 sheets, A4 size | OK | 400 YEN |
| C837 | 35468450 | 2010/02/27 21:05:56 | 2010/02/27 21:07:16 | Black-and-white print, 4 sheets, A3 size | OK | 80 YEN |
| ... | ... | ... | ... | ... | ... | ... |

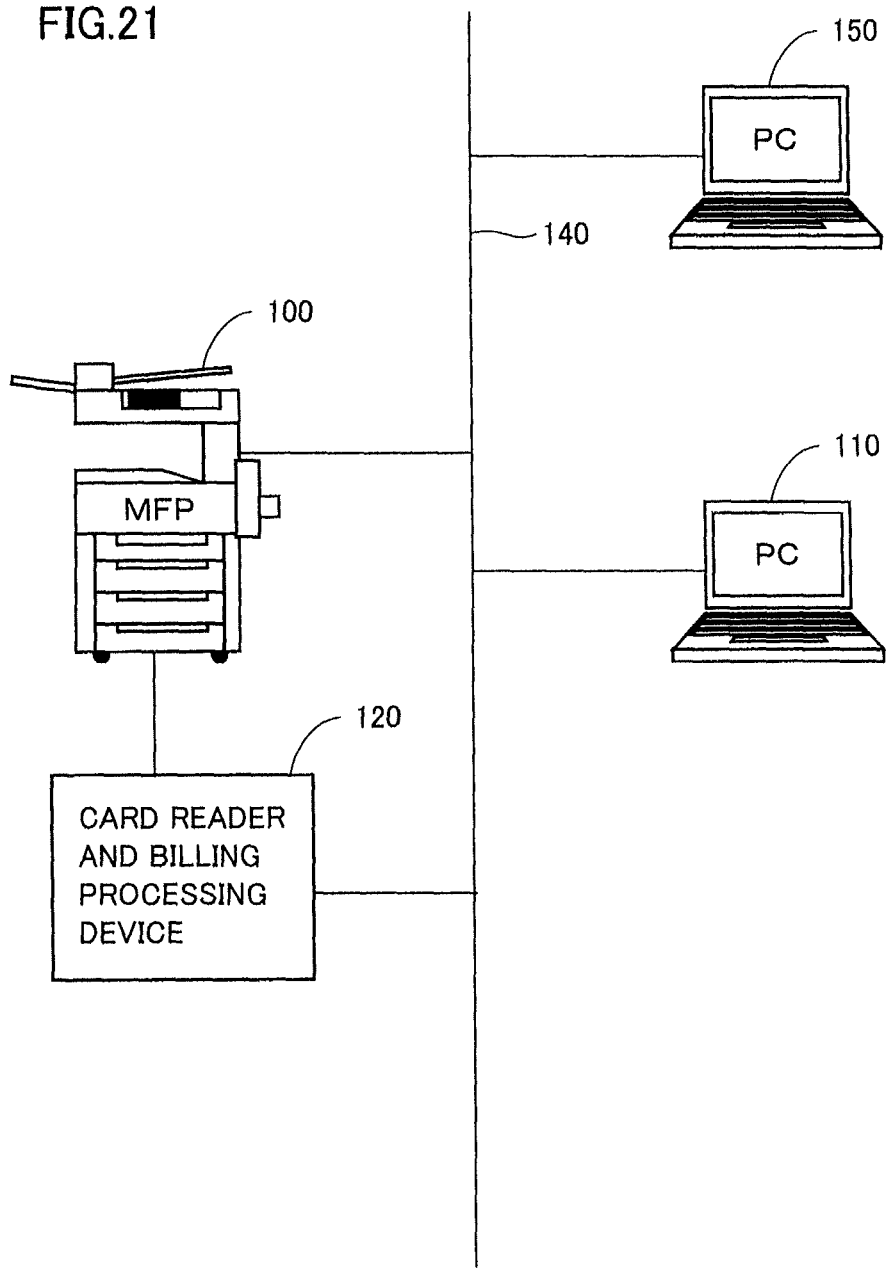

LOG INFORMATION MANAGEMENT APPARATUS FOR IMAGE FORMING APPARATUS, WHICH MANAGES JOB HISTORY PERFORMED BY USER

This application is based on Japanese Patent Application No. 2010-239853 filed with the Japan Patent Office on Oct. 26, 2010, the entire content of which is hereby incorporated by reference.

BACKGROUND OF THE INVENTION

1. Field of the Invention

The present invention relates to a log information management apparatus for an image forming apparatus, the image forming apparatus, a method for controlling the log information management apparatus for the image forming apparatus, and a recording medium in which a control program of the log information management apparatus for the image forming apparatus is stored, more specifically to a log information management apparatus for an image forming apparatus, which manages a job history performed by a user, the image forming apparatus, a method for controlling the log information management apparatus for the image forming apparatus, and a recording medium in which a control program of the log information management apparatus for the image forming apparatus is stored.

2. Description of the Background Art

Examples of an electrophotographic image forming apparatus include an MFP (Multi Function Peripheral) having a scanner function, a facsimile function, a copying function, a printer function, a data communication function, and a server function, a facsimile machine, a copying machine, and a printer.

In the image forming apparatus, there is a system in which a user is authenticated using an IC (Integrated Circuit) card to permit only the authenticated user to use the image forming apparatus. In the system, when the user brings the IC card into contact with (or close to) a card reader that is connected to or incorporated in the image forming apparatus, the image forming apparatus authenticates the user to permit the user to login.

Pieces of log information such as a login date and time of the user, a history (hereinafter occasionally referred to as a job history) of a job performed by the user in past times, and billing information are stored in the image forming apparatus or a server connected to the image forming apparatus. There has been proposed a technology of writing the log information in the log information IC card. According to the technology, the user can confirm the log information on the user using the IC card.

For example, in a program disclosed in Document 1, an information processing apparatus identifier, a user identifier, and an operation log on an input device, which are stored in a portable storage medium, are read when the storage medium is connected to an interface of a history management server, and the pieces of history data are stored in a memory of the history management server.

Document 1 Japanese Patent Laying-Open No. 2006-172074

Because it takes time to end the job since the job is performed, it takes time to fix the job history. Specifically, in the case of the job of facsimile transmission, although a manipulation of the user is ended when a destination number is input to scan a document, occasionally it takes several minutes to complete the transmission since the user ends the manipulation when the other party is on another line or when it takes time to transmit a large amount of data. In the case of job to scan the document to transmit image data of the document by an electronic mail, it takes time to complete the transmission because image processing and the mail transmission processing are executed after the image is scanned. It takes time to receive a reply of an error from a mail server when the mail is not delivered.

Particularly, in the case that usage of the image forming apparatus is charged to withdraw a billing amount (usage charge) from electronic money saved in the IC card, the billing amount is not fixed unless the job is completely ended. Therefore, it is necessary that the IC card be held on the card reader until the job is completely ended to fix the billing amount, and it is necessary that the IC card be released after the billing amount is written.

Although the IC card has an advantage that the login can be performed only by touching the card reader, when the job history is written in the IC card, it is necessary that the IC card be held (locked) on the card reader until the job history is fixed even after the login. Therefore, unfortunately user-friendliness of the IC card is degraded. In the configuration in which the IC card is held on the card reader, it is necessary to perform manipulations to put in (hold) the IC card on the card reader and to take out (release hold of) the IC card from the card reader. Therefore, unfortunately user-friendliness of the IC card is degraded.

Additionally, in the configuration in which the IC card is held on the card reader, the card reader is enlarged to increase cost.

In the case that the billing information on the usage of the image forming apparatus is not written in the IC card, it is necessary to provide a server that manages the billing information, which results in the enlargement of the system.

SUMMARY OF THE INVENTION

An object of the present invention is to provide a log information management apparatus for a convenient image forming apparatus, the image forming apparatus, a method for controlling the log information management apparatus for the image forming apparatus, and a recording medium in which a control program of the log information management apparatus for the image forming apparatus is stored.

Another object of the invention is to provide a log information management apparatus for an image forming apparatus, which can suppress enlargement of the apparatus, the image forming apparatus, a method for controlling the log information management apparatus for the image forming apparatus, and a recording medium in which a control program of the log information management apparatus for the image forming apparatus is stored.

According to an aspect of the present invention, a log information management apparatus for an image forming apparatus includes: an identification information acquisition unit that acquires identification information on a user from an information storage medium in which the identification information is stored; a flag setting unit that sets a flag indicating that processing relating to billing is not completed to the information storage medium from which the identification information is acquired by the identification information acquisition unit; a determination unit that determines whether the flag is set to the information storage medium from which the identification information is acquired by the identification information acquisition unit before the flag setting unit sets the flag after the identification information acquisition unit acquires the identification information; a job performing unit that causes the image forming apparatus to perform a job after the flag setting unit sets the flag; a history storage that causes a storage device to store a job history performed by the image forming apparatus based on completion of the performance of the job; a history writing unit that writes the job history in the information storage medium in which the determination unit determined that the flag is set, the job history being stored by the history storage, the job history relating to the identification information acquired by the identification information acquisition unit; and a flag releasing unit that releases the flag set by the flag setting unit after the job history is written by the history writing unit.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a view schematically illustrating card storage information stored in a storage 131 of IC card 130.

FIG. 5 is a view schematically illustrating a log information table stored in an HDD 114 of a management server 110.

FIG. 6 is a view schematically illustrating an ID information table stored in HDD 114 of management server 110.

FIG. 8 is a view schematically illustrating the card storage information in a state in which a remaining processing flag is set.

FIG. 9 is a view schematically illustrating the card storage information immediately after previous log information is written in the card storage information of FIG. 8 to release the remaining processing flag.

FIG. 10 is a view schematically illustrating the log information table immediately after the writing of the previous log information is completed.

FIG. 11 is a view schematically illustrating the card storage information immediately after login processing is completed.

FIG. 12 is a view schematically illustrating the log information table after performance of a new job is completed.

FIG. 21 is a block diagram illustrating a configuration of a log information management system according to a fourth modification of the embodiment.

DESCRIPTION OF THE PREFERRED EMBODIMENTS

Figure 1:
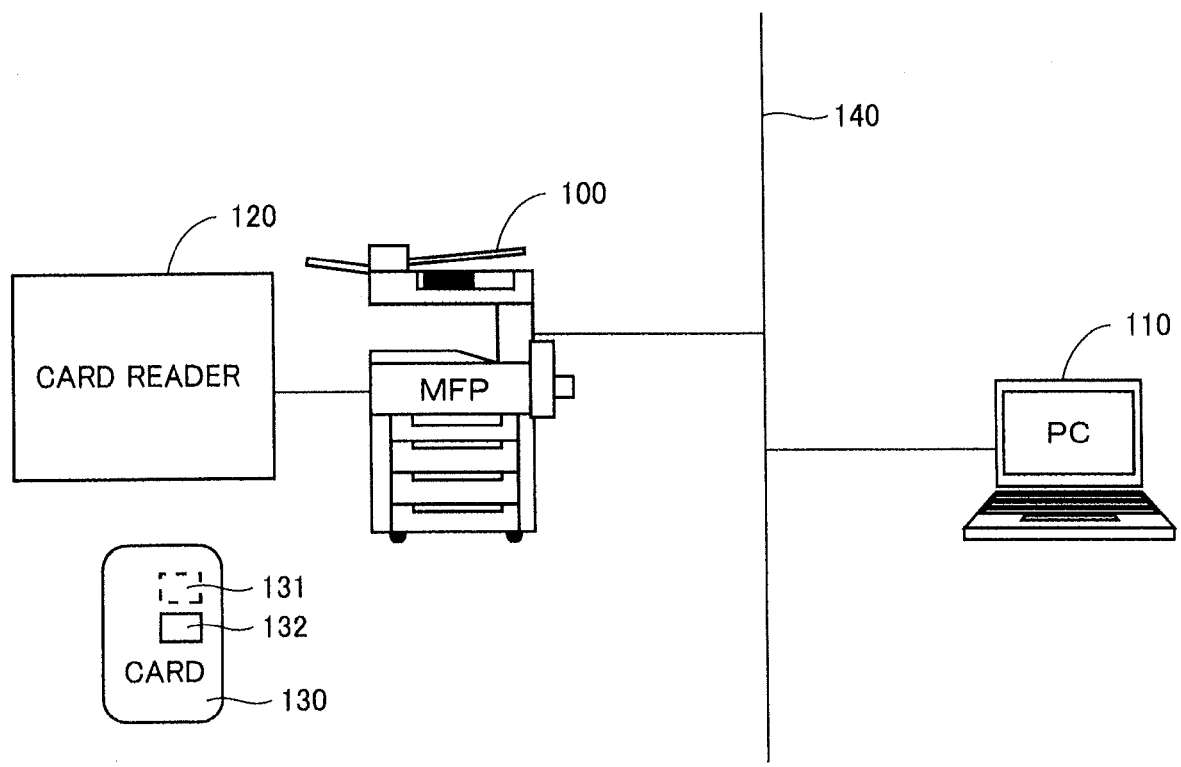
FIG. 1 is a conceptual view illustrating a configuration of a log information management system according to an embodiment of the invention.

Hereinafter, an embodiment of the present invention will be described below with reference to the drawings.
Configuration of Log Information Management System Referring to FIG. 1, a log information management system according to an embodiment includes a MFP 100, a management server 110, and a card reader 120. MFP 100 and management server 110 are connected to each other through a network 140, and card reader 120 is connected to MFP 100. MFP 100 includes a log information management apparatus.

Card reader 120 performs personal authentication using an IC card 130 (an example of the information storage medium). That is, card reader 120 conducts communication with IC card 130 possessed by a user in a contact or noncontact manner, acquires a card ID stored in a storage (IC unit) 131 of IC card 130, and transmits the card ID to MFP 100. Card reader 120 may be incorporated in MFP 100, provided near MFP 100 independently of MFP 100, or communicably connected to MFP 100 through a USB cable.

Network 140 is a wired or wireless LAN (Local Area Network). Network 140 is connected using a protocol of TCP/IP (Transmission Control Protocol/Internet Protocol). Devices connected to network 140 can transmit and receive various pieces of data to and from each other. The devices may be connected using a wide-area network such as the Internet and an exclusive line instead of network 140.

Figure 2:
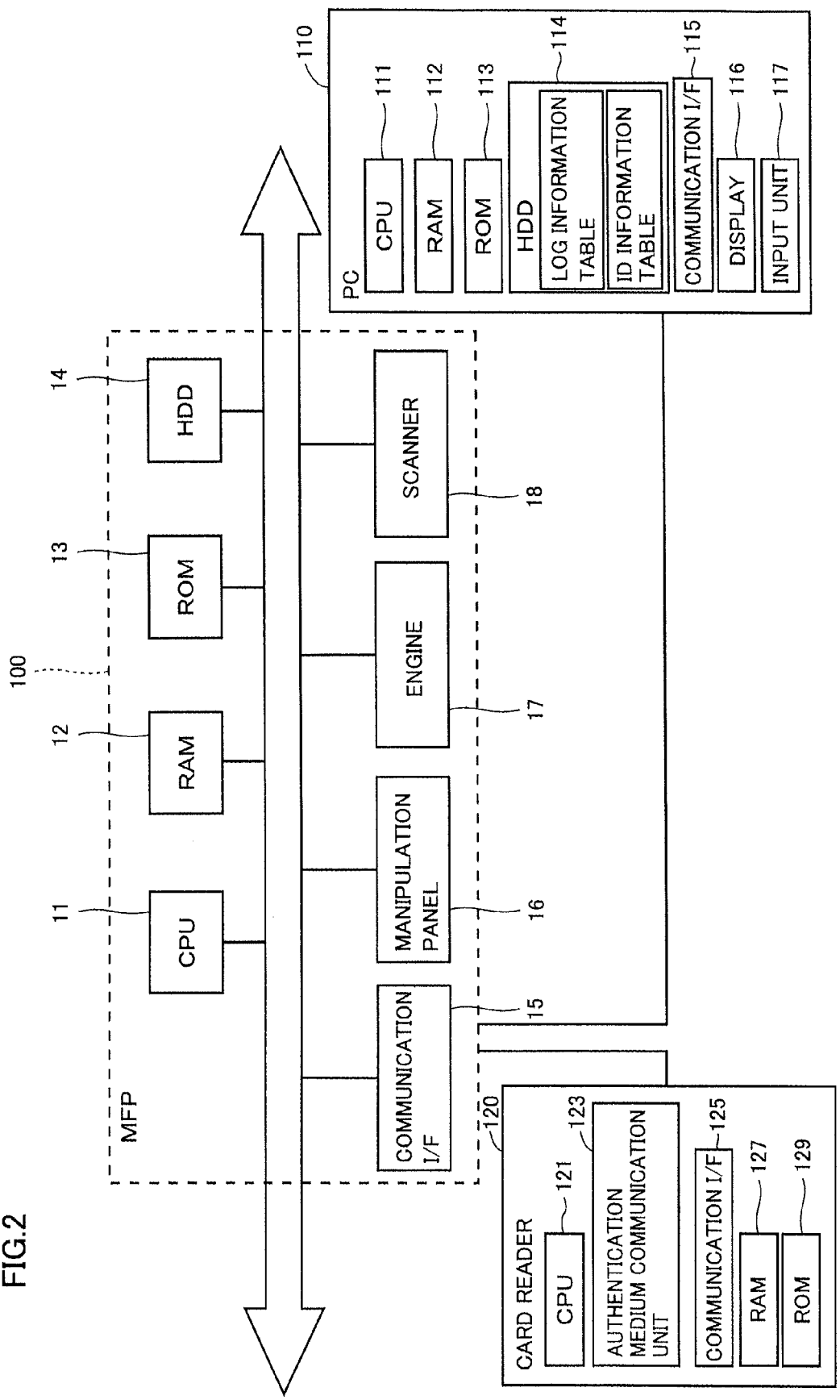
FIG. 2 is a block diagram illustrating a configuration of the log information management system of the embodiment.

FIG. 2 is a block diagram illustrating a configuration of the log information management system of the embodiment.

Referring to FIG. 2, MFP 100 includes a CPU (Central Processing Unit) 11, a RAM (Random Access Memory) 12, a ROM (Read Only Memory) 13, an HDD (Hard disk drive) 14 that is of a storage device, a communication interface (I/F) 15, a manipulation panel 16, an engine 17, a scanner 18.

CPU 11 controls the whole of MFP 100 with respect to various jobs such as a scan job, a copy job, a mail transmitting job, and a print job. CPU 11 performs a control program of the log information management system, which is stored in ROM 13. CPU 11 performs predetermined processing to read data of RAM 12 and ROM 13 to write data in RAM 12 and ROM 13.

RAM 12 is a main memory of CPU 11. RAM 12 is used to store data necessary for CPU 11 to perform the control program.

For example, ROM 13 is a flash ROM (Flash Memory). Various programs and various pieces of fixed data are stored in ROM 13 in order to operate MFP 100. ROM 13 may be a memory that is not rewritable.

HDD 14 is a storage device that stores pieces of data, such as print data, which are transmitted from an outside through communication I/F 15, and image data captured by an original reading unit (not illustrated).

In response to an instruction from CPU 11, communication I/F 15 conducts communication with an external device such as another MFP and management server 110 through a LAN using the communication protocol of TCP/IP.

Manipulation panel 16 includes a key input unit (not illustrated) including a numeral key pad and a start key and a display (not illustrated) including a liquid crystal touch panel. Manipulation panel 16 is used in various input manipulations such as performance of various jobs by the user and logout.

Engine 17 roughly includes a toner image forming unit, a fixing device, and a sheet conveying unit. For example, engine 17 forms an image on a sheet by an electrophotographic method. Engine 17 combines four-color images by what is called a tandem system to form a color image on the sheet. The toner image forming unit includes a photosensitive body that is provided in each of colors of C (cyan), M (magenta), Y (yellow), and K (black), an intermediate transfer belt to which a toner image is transferred (primary transfer) from the photosensitive body, and a transfer unit that transfers (secondary transfer) the image from the intermediate transfer belt to the sheet. The fixing device includes a heating roller and a pressurizing roller. In the fixing roller, the sheet on which the toner image is formed is conveyed while the sheet is nipped between the heating roller and the pressurizing roller, thereby heating and pressurizing the sheet. Therefore, the fixing device melts toner adhering to the sheet, fixes the toner to the sheet, and forms the image on the sheet. The sheet conveying unit includes a sheet feed roller, a conveying roller, and a motor that drives the sheet feed roller and the conveying roller. The sheet conveying unit feeds the sheet from a sheet feed cassette, and conveys the sheet in a casing of MFP 100. The sheet conveying unit also discharges the sheet on which the image is formed from the casing of MFP 100 to a sheet discharge tray or the like.

Scanner 18 reads the image of the original to converts the image into image data that is of electronic data.

Management server 110 is a personal computer (PC) that includes a CPU 111, a RAM 112, a ROM 113, an HDD 114, a communication I/F 115, a display 116 such as a monitor, and an input unit 117 such as a keyboard and a mouse.

CPU 111 conducts communication with MFP 100 and card reader 120, and executes various control programs according to a communication result. Particularly, CPU 111 executes processing in response to an instruction or an inquiry from MFP 100. CPU 111 executes predetermined processing to read data of RAM 112 and ROM 113 to write data in RAM 112 and ROM 113.

RAM 112 is a main memory of CPU 111. RAM 112 is used to store data necessary for CPU 111 to perform the control program.

For example, ROM 113 is a flash ROM. Various programs and various pieces of fixed data are stored in ROM 113 in order to operate management server 110. ROM 113 may be a memory that is not rewritable.

HDD 114 is a storage device that stores log information table (log database) (FIG. 5) and ID information table (FIG. 6).

In response to an instruction from CPU 111, communication I/F 115 conducts communication with an external device such as MFP 100 through the LAN using the communication protocol of TCP/IP.

Card reader 120 includes a CPU 121, an authentication medium communication unit 123, a communication I/F 125, a RAM 127, and a ROM 129.

CPU 121 executes various programs stored in ROM 129. CPU 121 conducts communication with MFP 100 and management server 110, and executes various control programs according to a communication result. CPU 121 executes the various control programs when IC card 130 is brought close to authentication medium communication unit 123.

For example, when IC card 130 is brought close to authentication medium communication unit 123, CPU 121 senses IC card 130. Then CPU 121 reads information stored in IC card 130 with authentication medium communication unit 123. CPU 121 transmits the read information to MFP 100 and management server 110.

Authentication medium communication unit 123 includes an antenna and a wireless circuit, which generate a magnetic field in order to conduct communication with IC card 130, and a circuit that demodulates and decodes the received information. Authentication medium communication unit 123 sets and releases a flag to and from IC card 130, and writes log information. Authentication medium communication unit 123 can control a display state of a display 132 of IC card 130. Authentication medium communication unit 123 is operated under the control of CPU 121.

Communication I/F 125 is connected to communication I/F 15 of MFP 100 through the USB cable. Therefore, card reader 120 is communicably connected to MFP 100 and management server 110.

Card reader 120 may have a function (of being able to leave IC card 130 on card reader 120) of retaining IC card 130 while the information is read from or written in IC card 130.

Figure 3:
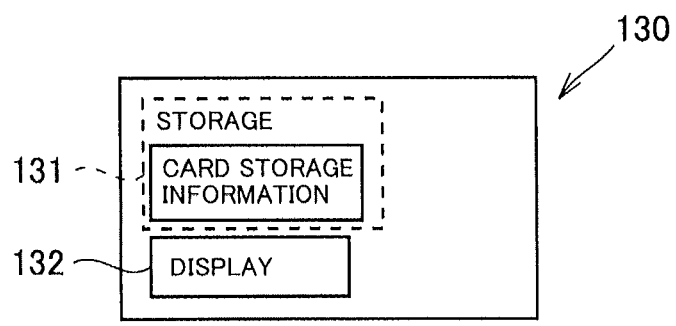
FIG. 3 is a plan view of an IC card 130.

FIG. 3 is a plan view of IC card 130.

Referring to FIG. 3, IC card 130 is what is called a non-contact IC card. IC card 130 includes a storage 131 that is buried therein and an antenna (not illustrated). When IC card 130 is brought close to the antenna of authentication medium communication unit 123, a current is generated in the antenna of IC card 130 by electromagnetic induction. Storage 131 is driven using the current as a power source. When storage 131 is driven, storage 131 modulates information stored therein and outputs a radio wave from the antenna. The card storage information (FIG. 4) is stored in storage 131. Card reader 120 can read the information stored in storage 131 by receiving and demodulating the radio wave. A contact IC card may be used as IC card 130.

IC card 130 is distributed to each user of MFP 100, and used to authenticate each user. The card storage information stored in storage 131 of IC card 130 distributed to each user includes a card ID that is of identification information on the user and the log information.

As used herein, the log information means a history relating to general manipulation of MFP 100, which is performed by the user in past times. The log information includes an operation log and a job history. The operation log means information on login of the user, a manipulation content of MFP 100, and logout. The job history means a history relating to a job performed by the user. The job history includes a job performance time, a job content, and job billing information.

Electronic money may be saved in IC card 130, and a usage charge of the performed job may be collected from the electronic money saved in IC card 130. The log information stored in IC card 130 may include billing information on the performed job. The billing information means information on billing of the job. The billing information includes the usage charge of the job and information on a balance of the electronic money saved in IC card 130.

IC card 130 also includes display 132. Display 132 changes a display state by electric or magnetic action. For example, display 132 includes a liquid crystal display. Display 132 displays the state of IC card 130 to the outside.

Card Storage Information, Log Information Table, and ID Information Table

FIG. 4 is a view schematically illustrating the card storage information stored in storage 131 of IC card 130.

Referring to FIG. 4, the card storage information stored in storage 131 includes the card ID and the log information. The card ID means the identification information on the user who is an owner of IC card 130. In FIG. 4, an eight-digit number "12345678" is the card ID.

The log information is stored in the card storage information of FIG. 4 in each performed job. The log information on one job is stored in a horizontal direction (row direction) of the table. Items of a "login time", a "job performance time", a "job content", a "usage charge" (the billing amount of the job), and "balance" (balance of the electronic money saved in IC card 130) are stored as the log information. The "login time" is the manipulating log, and the "job performance time", the "job content", the "usage charge, and the "balance" are the job history. Particularly, the "usage charge" and the "balance" correspond to the information (billing information) on the usage charge (billing amount) of the job in the job history. The pieces of log information are arrayed in a vertical direction (column direction) of the table in a reverse chronological order of the job performance time.

As can be seen from the card history information of FIG. 4, for example, the user who is the owner of IC card 130 logins to MFP 100 at 11:30:10 on Feb. 22, 2010, and performs the job to perform facsimile transmission of four A4-size documents at 11:30:31 on Feb. 22, 2010. The usage charge of the job is 100 yen, and the balance of the electronic money saved in IC card 130 becomes 2610 yen as a result of the withdrawal of the usage charge of the job.

An item of a "remaining processing flag" (log writing flag) relating to the billing is provided on the right of each piece of log information, and the remaining processing flag can be set to each piece of log information. The case in which the remaining processing flag is set means that, in the billing processing, the log information (previous log information) in the previous login is not written in IC card 130 yet (processing is not completed but remains).

FIG. 5 is a view schematically illustrating the log information table stored in HDD 114 of management server 110.

Referring to FIG. 5, the pieces of log information that are not written in IC card 130 are stored in the log information table in each performed job. The log information on one job is stored in the horizontal direction (row direction) of the table. Items of a "user name" (the user name performing the job), the "card ID" (the card ID possessed by the user who performs the job), the "login time", the "job performance time", the "job content", a "login result" (whether the login is correctly received), and the "usage charge" are stored as the log information. The "login result" corresponds to the operation log. The pieces of log information are arrayed in the vertical direction (column direction) of the table in the reverse chronological order of the job performance time.

As can be seen from the log information table of FIG. 5, for example, the user who has the user name of "ABCD" and the card ID of "12345678" logins to MFP 100 at 13:12:35 on Feb. 28, 2010, and performs the job to perform the facsimile transmission of 21 A4-size documents at 13:14:30 on Feb. 28, 2010, but the job is not written in IC card 130 of the user yet.

The log information table includes the log information on the job that is not correctly completed in addition to the job that is correctly completed. For example, the job that is not correctly completed includes the case in which a destination of an electronic mail is unclear in the job to transmit the electronic mail and the case in which a jam is generated in the job to copy the document.

Figure 18:
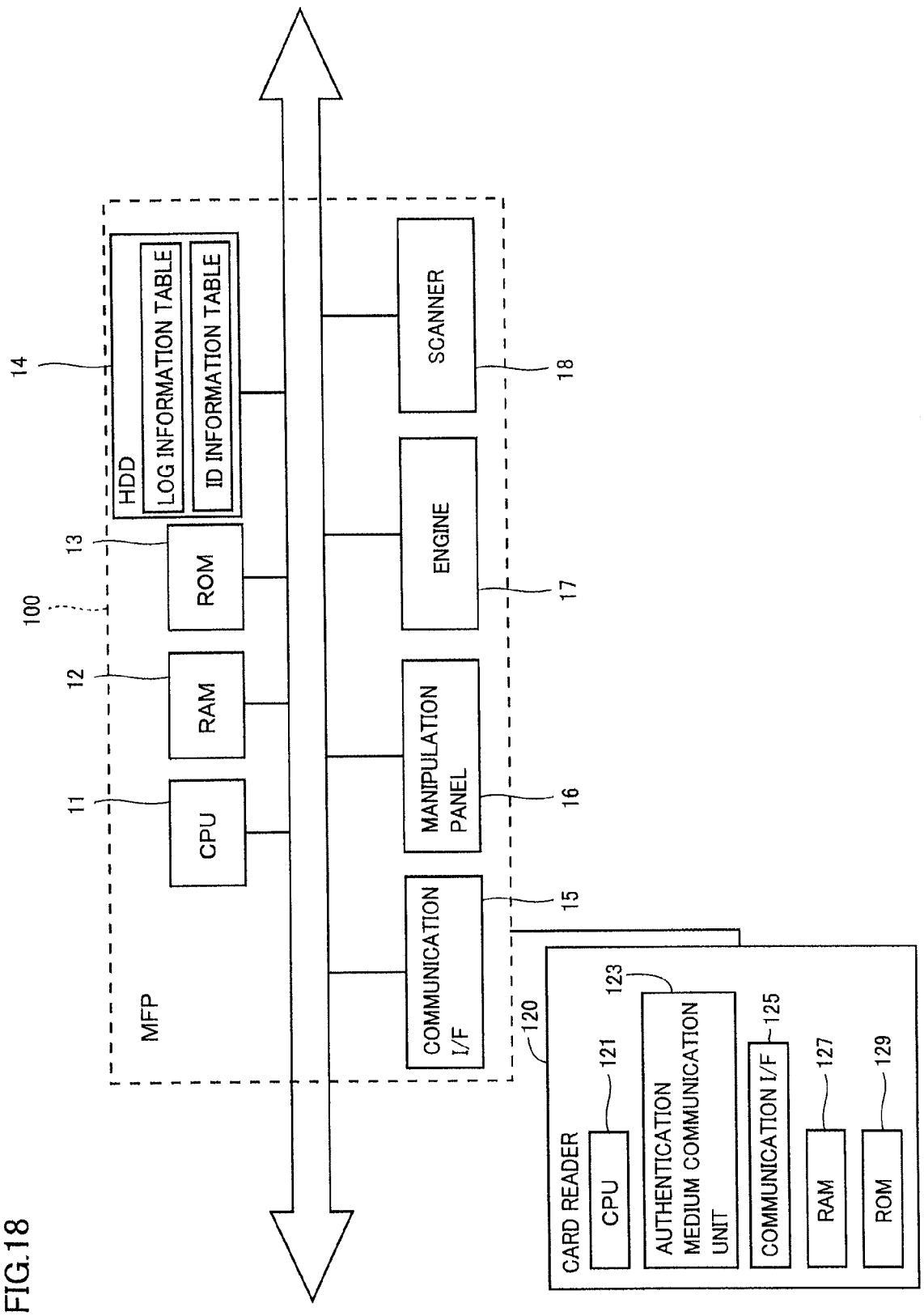
FIG. 18 is a block diagram illustrating a configuration of a log information management system according to a first modification of the embodiment.

The log information table may be stored in HDD 14 of MFP 100 instead of storing the log information table in HDD 114 of management server 110. With reference to FIG. 18, the case in which the log information table is stored in HDD 14 of MFP 100 is described later.

FIG. 6 is a view schematically illustrating the ID information table stored in HDD 114 of management server 110.

Referring to FIG. 6, in the ID information table, ID information on one user is stored in the horizontal direction (row direction). Items of the "card ID", the "user name" (the user name who is the owner of the IC card in which the card ID is stored), and "usage of MFP" (information on whether the user is permitted to use MFP 100) are stored as the ID information.

As can be seen from the ID information of FIG. 6, for example, the user who has the card ID of "12345678" and the user name of "ABCD" is permitted to use MFP 100, while the user who has the card ID of "32465784" and the user name of "A815" is not permitted to use MFP 100.

In response to an inquiry from MFP 100, management server 110 searches the card ID that is matched with the card ID, which is received from card reader 120, from the ID information table, and management server 110 determines whether the user of the card ID is permitted to use MFP 100. When the user is permitted to use MFP 100, management server 110 notifies MFP 100 that the card Ill can be used. When the user is not permitted to use MFP 100, or when the corresponding card ID does not exists in the ID information table, management server 110 notifies MFP 100 that the card ID cannot be used. The ID information table is produced such that a manager of the log information management system inputs each item.

Method for writing Log Information in IC Card

A method for writing the log information in IC card 130 of the embodiment will be described below.

Figure 7:
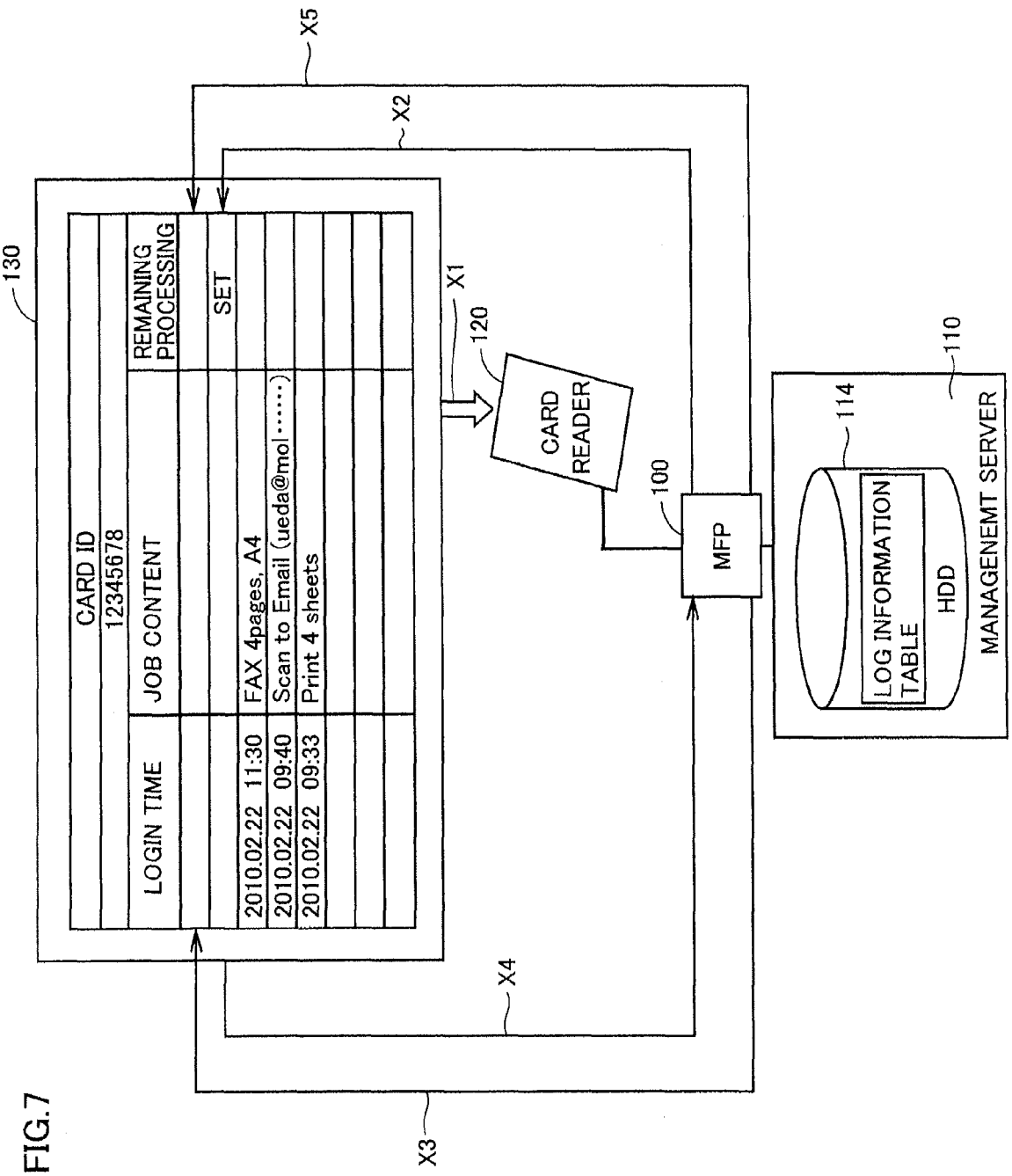
FIG. 7 is a conceptual view illustrating writing of log information in IC card 130.

FIG. 7 is a conceptual view illustrating the writing of the log information in IC card 130. Although only the items of the login time, the job content, and the remaining processing flag are illustrated in the card storage information of FIG. 7, it is assumed that the items illustrated in FIG. 4 are included in the actual card storage information.

Referring to FIG. 7, in performing the authentication with IC card 130, the user passes IC card 130 of the user over card reader 120 as illustrated by an arrow X1.

When card reader 120 senses IC card 130, card reader 120 reads the card ID and the remaining processing flag of IC card 130 to transmit the card ID and the remaining processing flag to MFP 100. As illustrated by an arrow X2, MFP 100 determines whether the remaining processing flag is set to the card history information of IC card 130.

When the remaining processing flag is set to the card history information of IC card 130, remaining processing of writing predetermined data in IC card 130 is performed. That is, management server 110 searches the log information from the log information table by the card ID. Because the log information that is not written in IC card 130 yet is recorded in the log information table, the searched log information is the not-yet-written log information that is of the log information in the previous login of the user who is the owner of IC card 130. MFP 100 acquires the previous log information found by the search, and the log information is written in the card storage information of IC card 130 in response to the instruction of MFP 100 as illustrated by an arrow X3. When the previous log information is written, the items in the log information table, namely, the "login time, the "job performance time", the "job content", "usage charge", and the "balance" are written in the card storage information.

When the writing in IC card 130 is completed, the written log information is deleted from the log information table in response to the instruction of MFP 100, and the remaining processing flag set to IC card 130 is released (cleared) in response to the instruction of MFP 100. When the user does not perform the job in the previous login, the log information performed by the user is not stored in the log information table. In this case, nothing is written in IC card 130 (or only the operation logs such as the login time and the logout time are written in IC card 130), and the remaining processing flag is released.

After the remaining processing flag set to IC card 130 is released, or when the remaining processing flag is not set to IC card 130, MFP 100 executes login processing of the user as illustrated by an arrow X4. That is, the next authentication cannot be performed unless the remaining processing flag is released, but the login is permitted after the remaining processing flag is released.

On the other hand, when the remaining processing flag is not set to the card history information of ID card 130, because the previous log information is already written in ID card 130 (post-processing is completed), MFP 100 directly executes the login processing of the user.

When the job to which the login processing is completed can be performed (when the new job is started), the remaining processing flag is newly set to ID card 130 in response to the instruction of MFP 100 as illustrated by an arrow X5. The newly-set remaining processing flag means that the log information (current log information) in the current login is not written in IC card 130 yet. When the remaining processing flag is set to ID card 130, IC card 130 can be taken away from card reader 120. The login time may be written in the card storage information when the remaining processing flag is set.

When MFP 100 performs the job after the login, the log information including the job history is produced in the log information table in response to the instruction of MFP 100 after the job is completed.

When the user logouts after performing the job, the data can occasionally be written in IC card 130 for the reason that IC card 130 is retained by card reader 120. In such cases, MFP 100 acquires the current log information from the log information table, and the current log information is written in the card storage information of IC card 130 in response to the instruction to MFP 100. After the current log information is written in the card storage information, the written current log information is deleted from the log information table in response to the instruction of MFP 100, and the remaining processing flag set to the card storage information is released. When the remaining processing flag is released, the user is permitted to take IC card 130 away from card reader 120. Thus, the remaining processing and the logout are collectively executed when the log information can be written in IC card 130 during the logout.

When the current log information is written in IC card 130 during the logout, because the remaining processing flag of IC card 130 is released, the current log information is not written in IC card 130 during the next login. However, in the system in which card reader 120 performs the authentication using noncontact IC card 130, frequently the user removes IC card 130 when the user authentication is ended (frequently the user performs touch authentication). In such systems, the current log information cannot be written in IC card 130 during the logout. In such cases, when card reader 120 senses IC card 130 next time (during the next login), the current log information is written based on the remaining processing flag in response to the instruction of MFP 100, MFP 100 executes the login processing subsequent to the remaining processing.

In the case that the usage charge of the performed job is collected from the electronic money saved in IC card 130, a given amount of money may be collected from the electronic money saved in IC card 130 by card reader 120 when the remaining processing flag is newly set after the login processing. In this case, a balance amount between the previously-collected given amount of money and the usage charge of the performed job may be settled (refunded or collected) when the log information is written in the card storage information by card reader 120. In the case that the settlement cannot be performed, the next login may be rejected by MFP 100, or MFP 100 may reject the performance of the new job.

FIG. 8 is a view schematically illustrating the card storage information in a state in which the remaining processing flag is set.

Referring to FIG. 8, the remaining processing flag is set to the previous log information. The items of the "login time", the "job performance time", the "job content", the "usage charge", and the "balance" of the previous log information are not written yet.

FIG. 9 is a view schematically illustrating the card storage information immediately after the previous log information is written in the card storage information of FIG. 8 to release the remaining processing flag.

Referring to FIG. 9, the items of the "login time" (at 13:12:35 on Feb. 28, 2010), the "job performance time" (at 13:14:30 on Feb. 28, 2010), the "job content" (facsimile transmission of 21 A4-size documents), the "usage charge" (200 yen), and the "balance" (2410 yen) of the previous log information, which are not written in the card storage information of FIG. 8, are written. As a result of searching the log information table of FIG. 5, the items are obtained based on the card ID of "12345678" of IC card 130. The item of the remaining processing flag becomes blank.

FIG. 10 is a view schematically illustrating the log information table immediately after the writing of the previous log information is completed.

Referring to FIG. 10, when the writing of the previous log information is completed, the written log information (the log information on the user name "ABCD" of FIG. 5) is deleted from the log information table of FIG. 5.

FIG. 11 is a view schematically illustrating the card storage information immediately after the login processing is completed.

Referring to FIG. 11, the remaining processing flag is newly set to the card storage information immediately after the login processing is completed. The items of the "login time", the "job performance time", the "job content", and the "usage charge" are not written. This is attributed to the fact that the specific contents of the job are not fixed yet because the instruction to perform the job is not received yet from the user immediately after the login processing is completed.

FIG. 12 is a view schematically illustrating the log information table after performance of a new job is completed.

Referring to FIG. 12, after the performance of the new job is completed, the user who performs the job, the card ID, the job performance time, the job content, and the usage charge of the job are fixed. The "login time" and the "login result" are already fixed during the login processing. The new log information including the "user name" (ABCD), the "card ID" (12345678), the "login time" (at 17:25:31 on Feb. 28, 2010), the "job performance time" (at 17:26:2 on Feb. 28, 2010), the "job content", (monochrome print of 8 A4-size sheets), the "login result" (successful login), and the "usage charge" (80 yen) is produced in the log information table. The produced log information is stored in the log information table until written in the card storage information of IC card 130.

Relationship between Remaining Processing Flag and Display of IC Card

In the case that IC card 130 includes display 132, the display state of display 132 may be changed according to the setting or release of the flag.

Figure 13:
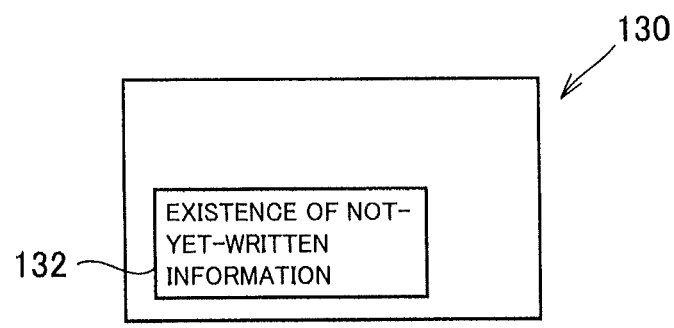
FIG. 13 is a view schematically illustrating a display state of a display 132 when the remaining processing flag is set to IC card 130.

FIG. 13 is a view schematically illustrating a display state of display 132 when the remaining processing flag is set to IC card 130. Storage 131 is not illustrated in FIG. 13 because storage 131 is buried in IC card 130.

Referring to FIG. 13, when the remaining processing flag is set, the display state of display 132 is changed so as to indicate that the remaining processing flag is set. In FIG. 13, characters of "existence of not-yet-written information" are displayed on display 132. Therefore, the user is informed that the not-yet-written log information exists in IC card 130, and the user can be encouraged to write the log information.

Instead of displaying the characters on display 132, a color of display 132 may be changed, or a specific mark may be added on display 132.

When the setting of the remaining processing flag is released, the display state of display 132 is returned to an original state (the state in which nothing is displayed as illustrated in FIG. 3). When the setting of the remaining processing flag is released, the characters such as "already settled" may be displayed on display 132 in addition to the state of FIG. 3.

Instead of displaying the characters such as "existence of not-yet-written information" or "already settled", the card storage information of FIG. 4 may be displayed on display 132.

Operation of Log Information Management System

With reference to FIGS. 14 to 17, operations of MFP 100, management server 110, and card reader 120 in the log information management system will be described below.

Figure 14:
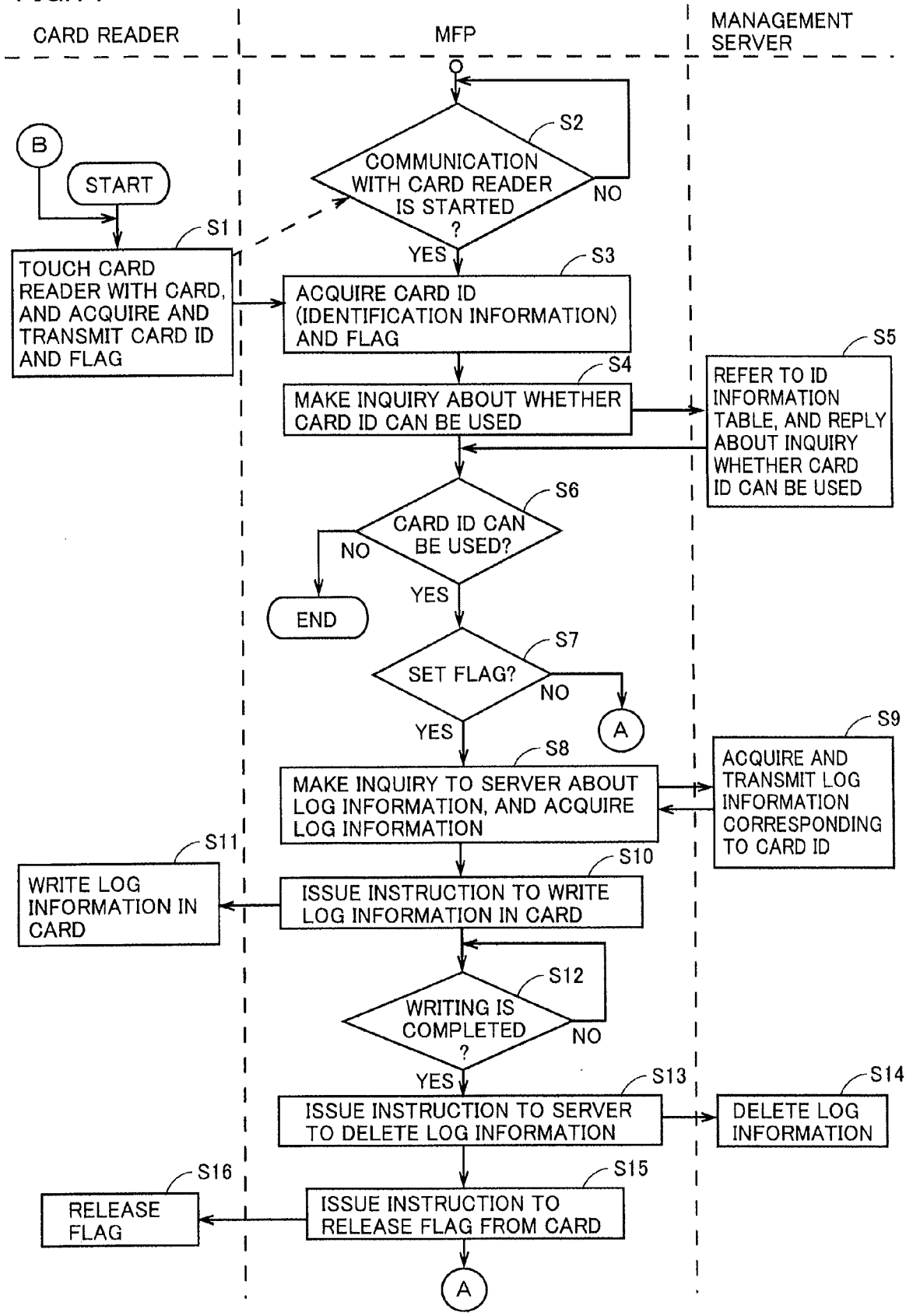
FIG. 14 is a first half of a flowchart illustrating an operation of the log information management system.
Figure 15:
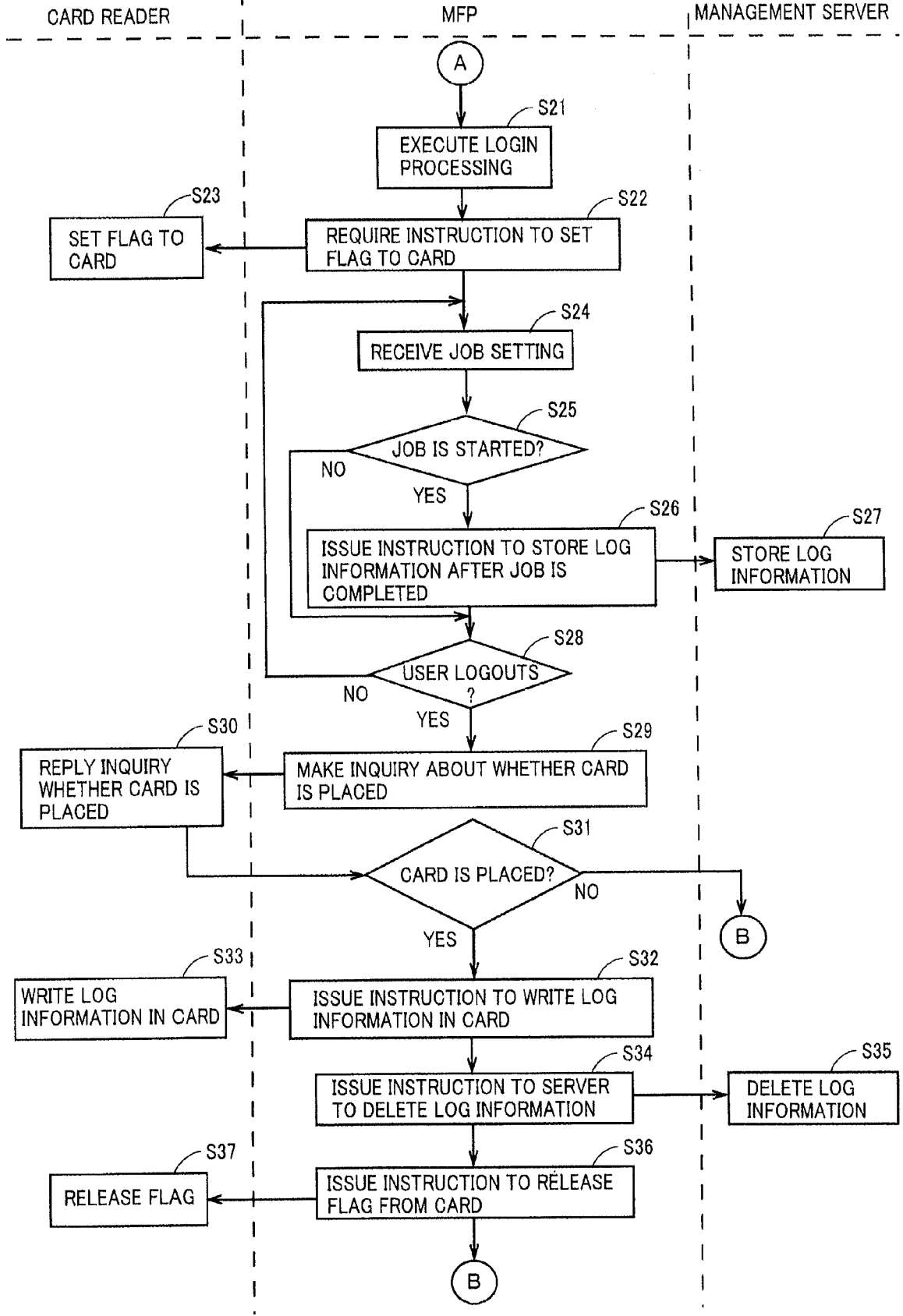
FIG. 15 is a second half of the flowchart illustrating the operation of the log information management system.

Referring to FIG. 14, when the user touches card reader 120 with IC card 130 (passes IC card 130 over card reader 120) in order to login to MFP 100, CPU 121 of card reader 120 acquires the card ID and the information on the setting of the remaining processing flag from the card storage information of IC card 130, and starts communication with MFP 100 to transmit the card ID and the information on the setting of the remaining processing flag (S1). When the communication with card reader 120 is started (YES in S2), CPU 11 of MFP 100 acquires the card ID (identification information) and the information on the setting of the remaining processing flag from card reader 120 (S3), and CPU 11 makes an inquiry to management server 110 whether the acquired card ID can be used (S4). When receiving the inquiry about the card ID from MFP 100, CPU 111 of management server 110 refers to the ID information table stored (memorized) in HDD 114 and replies to MFP 100 about the inquiry whether the card ID can be used (S5). When CPU 11 of MFP 100 receives the reply that the acquired card ID cannot be used from management server 110 (NO in S6), CPU 11 does not allow the usage of MFP 100, and the processing is ended. On the other hand, when CPU 11 receives the reply that the acquired card ID can be used from management server 110 (YES in S6), CPU 11 determines (checks) whether the remaining processing flag is set to IC card 130 based on the information on the setting of the remaining processing flag acquired from card reader 120 (S7).

When CPU 11 determines that the remaining processing flag is set in Step S7 (YES in S7), the previous log information is not written in IC card 130 yet. In this case, CPU 11 makes an inquiry to management server 110 about the log information on the acquired card ID (S8). When receiving the inquiry about the log information from MFP 100, CPU 111 of management server 110 acquires the log information corresponding to the card ID in question from the log information table stored in management server 110, and transmits the log information to MFP 100 (S9). When acquiring the log information corresponding to the card ID from management server 110 (S8), CPU 11 of MFP 100 transmits the acquired log information to card reader 120, and issues an instruction to card reader 120 to write the log information in IC card 130 (S10). In response to the instruction to write the log information in IC card 130 from MFP 100, CPU 121 of card reader 120 writes the received log information in IC card 130 (S11). On the other hand, when CPU 11 determines that the remaining processing flag is not set in Step S7 (NO in S7), the previous log information is already written in IC card 130. In this case, CPU 11 goes to Step S21.

After issuing the instruction to write the log information in IC card 130 in Step S10, CPU 11 of MFP 100 determines whether the writing of the log information in IC card 130 is completed (ended) (S12). When the writing of the log information in IC card 130 is completed (YES in S12), CPU 11 issues an instruction to management server 110 to delete the written log information from the log information table (S13), and CPU 11 issues an instruction to card reader 120 to release the remaining processing flag from IC card 130 (S15). In response to the instruction to delete the log information from MFP 100, CPU 111 of management server 110 deletes the log information from the log information table (S14). In response to the instruction to release the remaining processing flag from MFP 100, CPU 121 of card reader 120 releases the remaining processing flag from IC card 130 to change the display state of the display 132 to the state in which nothing is displayed (the state of FIG. 3) (S16). After issuing the instruction to release the remaining processing flag in Step S16, CPU 11 of MFP 100 goes to Step S21 of FIG. 15.

In Step S21, CPU 11 of MFP 100 executes the processing in which the user logins to MFP 100 (S21). After completing the login processing, CPU 11 issues an instruction to card reader 120 to newly set the remaining processing flag to IC card 130 (S22) and goes to Step S24. In response to the instruction to set the remaining processing flag from MFP 100, CPU 121 of card reader 120 sets the remaining processing flag to IC card 130 to display the characters of "existence of not-yet-written information" on display 132 (S23).

In Step S24, CPU 11 of MFP 100 receives the setting of the job from the user through, for example, manipulation panel 16 (S24), and CPU 11 determines whether the job is started within a given time (S25). When MFP 100 starts the job within the given time (YES in S25), CPU 11 issues an instruction to management server 110 to store the new log information on the completed job in the log information table after the job is completed (S26), and CPU 11 goes to Step S28. In response to the instruction to store the log information from CPU 11, CPU 111 of management server 110 stores the log information on the completed job in the log information table (S27). On the other hand, when MFP 100 does not start the job within the given time (NO in S25), CPU 11 goes to Step S28.

In Step S28, CPU 11 of MFP 100 determines whether the user logouts within a given time (S28). When the user does not logout within the given time (NO in S28), CPU 11 returns to Step S24 to receive the setting of the job from the user (S24).

In Step S28, when the user logouts within the given time (YES in S28), CPU 11 makes an inquiry to card reader 120 about whether IC card 130 is placed on card reader 120 (S29). When receiving the inquiry about IC card from MFP 100, CPU 121 of card reader 120 replies to MFP 100 about the inquiry whether IC card 130 is placed on card reader 120 (S30). In Step S30, when the log information can be written in IC card 130 even if IC card 130 is not placed on card reader 120, the reply that IC card 130 is placed on card reader 120 may be made. For example, when the user passes IC card 130 over card reader 120 during the logout, the log information can be written in IC card 130.

Based on the reply from card reader 120 in Step S30, CPU 11 of MFP 100 determines whether IC card 130 is placed on card reader 120 (S31). When determined that IC card 130 is placed on card reader 120 (YES in S31), CPU 11 transmits the log information on the completed job to card reader 120, and issues an instruction to card reader 120 to write the log information in IC card 130 (S32). In response to the instruction to write the log information from MFP 100, CPU 121 of card reader 120 writes the log information on the completed job in IC card 130 (S33). When determined that IC card 130 is not placed on card reader 120 (NO in S31), CPU 11 returns to Step S1 of FIG. 14 without performing the writing of the log information in IC card 130.

After the writing of the log information in IC card 130 is completed, CPU 11 of MFP 100 issues an instruction to management server 110 to delete the written log information from the log information table (S34). CPU 11 also issues an instruction to card reader 120 to release the remaining processing flag from IC card 130 (S36). After issuing the instructions to delete the log information and to release the remaining processing flag, CPU 11 returns to Step S1 of FIG. 14. In response to the instruction to delete the log information from MFP 100, CPU 111 of management server 110 deletes the log information from the log information table (S35). In response to the instruction to release the remaining processing flag from MFP 100, CPU 121 of card reader 120 releases the remaining processing flag from IC card 130 to change the display state of display 132 to the state in which nothing is displayed (the state of FIG. 3) (S37).

Figure 16:
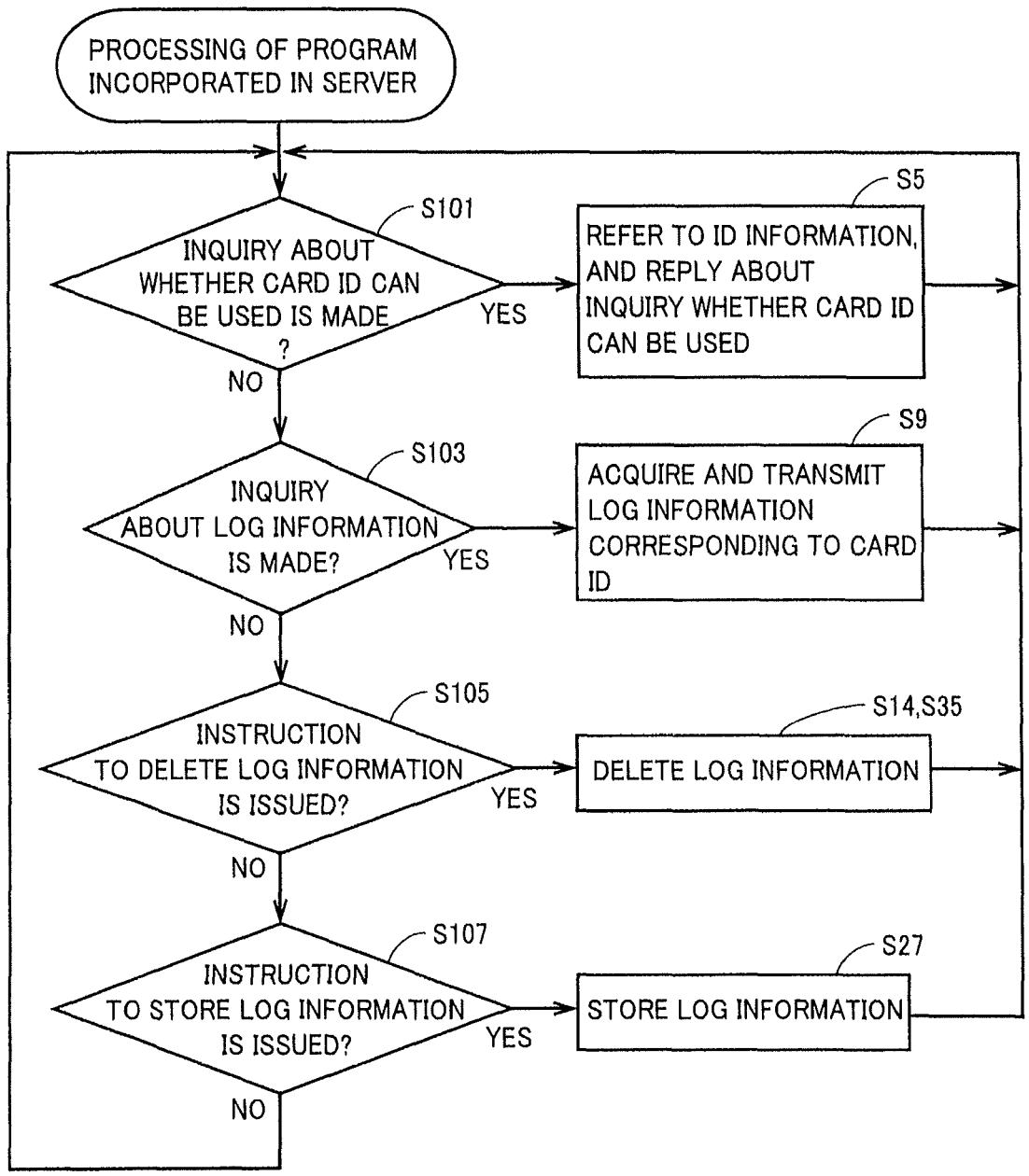
FIG. 16 is a flowchart illustrating processing of a program incorporated in a management server 110.

FIG. 16 is a flowchart illustrating processing of a program incorporated in management server 110.

Referring to FIG. 16, CPU 111 of management server 110 determines whether an inquiry whether the card ID can be used is received from MFP 100 (S101). When the inquiry whether the card ID can be used is received from MFP 100 (YES in S101), CPU 111 refers to the ID information table and replies to MFP 100 about the inquiry whether the card ID in question can be used (S5). Then CPU 111 returns to Step S101.

In Step S101, when the inquiry whether the card ID can be used is not received from MFP 100 (NO in S101), CPU 111 determines whether an inquiry about the log information on the card ID is received from MFP 100 (S103). When the inquiry about the log information on the card ID is received from MFP 100 (YES in S103), CPU 111 acquires the log information corresponding to the card ID in question from the log information table stored in management server 110 and transmits the log information to MFP 100 (S9). Then CPU 111 returns to Step S101.

In Step S103, when the inquiry about the log information on the card ID is not received from MFP 100 (NO in S103), CPU 111 determines whether an instruction to delete the log information from the log information table is received from MFP 100 (S105). When the instruction to delete the log information from the log information table is received from MFP 100 (YES in S105), CPU 111 deletes the log information from the log information table (S14 and S35). Then CPU 111 returns to Step S101.

In Step S105, when the instruction to delete the log information from the log information table is not received from MFP 100 (NO in S105), CPU 111 determines whether an instruction to store the new log information in the log information table is received from MFP 100 (S107). When the instruction to store the new log information in the log information table is received from MFP 100 (YES in S107), CPU 111 stores the log information in the log information table (S27). Then CPU 111 returns to Step S101.

In Step S107, when the instruction to store the new log information in the log information table is not received from MFP 100 (NO in S107), CPU 111 returns to Step S101 to determine whether the inquiry whether the card ID can be used is received from MFP 100 again (S101).

Figure 17:
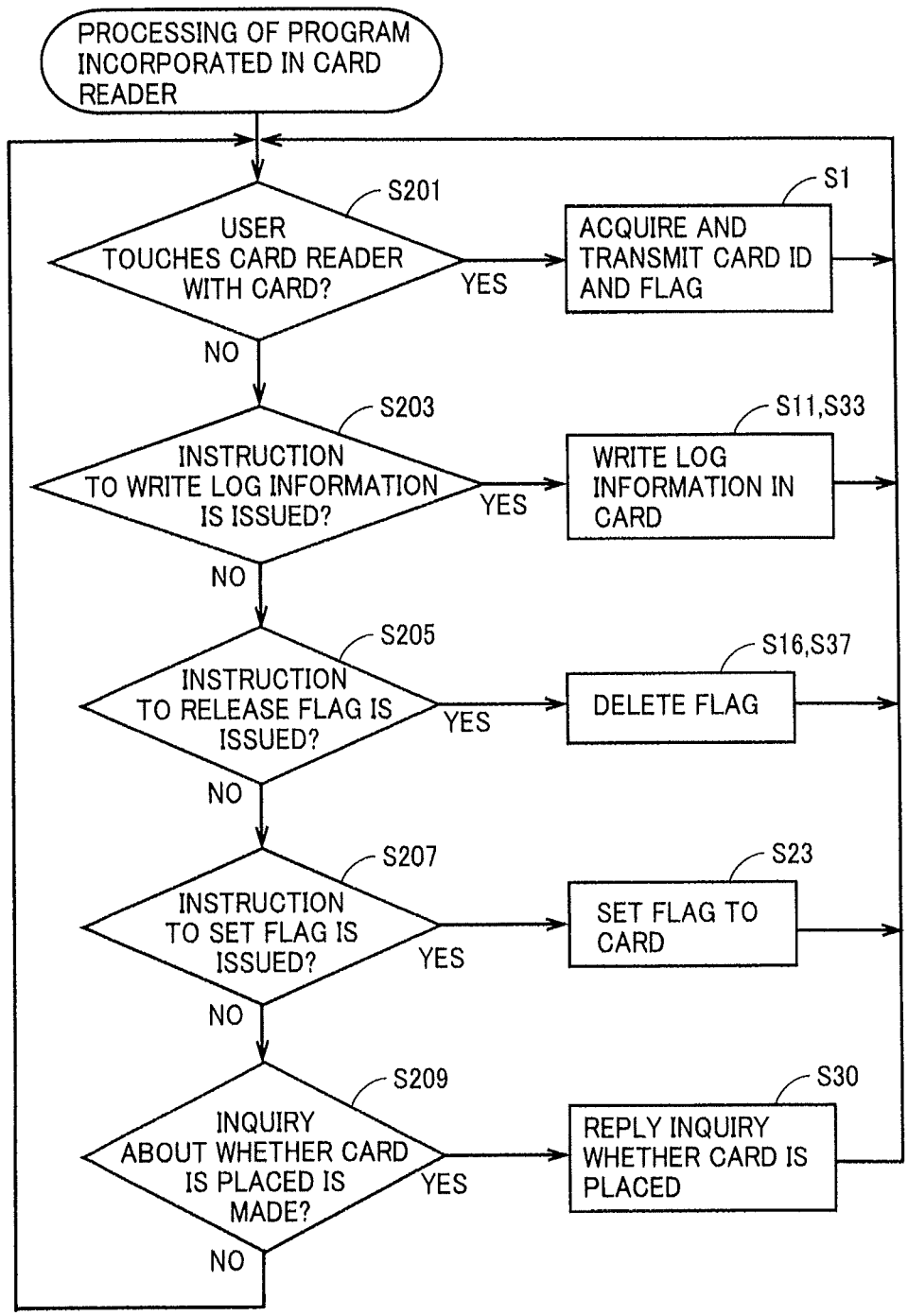
FIG. 17 is a flowchart illustrating processing of a program incorporated in a card reader 120.

FIG. 17 is a flowchart illustrating processing of a program incorporated in card reader 120.

Referring to FIG. 17, CPU 121 of card reader 120 determines whether the user touches card reader 120 with IC card 130 (S201). When the user touches card reader 120 with IC card 130 (YES in S201), CPU 121 acquires the card ID and the information on the setting of the remaining processing flag from the card storage information of IC card 130, and starts the communication with MFP 100 to transmit the card ID and the information on the setting of the remaining processing flag (S1). Then CPU 121 returns to Step S201.

In Step 201, when the user does not touch card reader 120 with IC card 130 (NO in S201), CPU 121 determines whether an instruction to write the log information in IC card 130 is received from MFP 100 (S203). When the instruction to write the log information in IC card 130 is received from MFP 100 (YES in S203), CPU 121 writes the log information received from MFP 100 in IC card 130 (S11 and S33). Then CPU 121 returns to Step S201.

In Step 203, when the instruction to write the log information in IC card 130 is not received from MFP 100 (NO in S203), CPU 121 determines whether an instruction to release the remaining processing flag from IC card 130 is received from MFP 100 (S205). When the instruction to release the remaining processing flag from IC card 130 is received from MFP 100 (YES in S205), CPU 121 releases the remaining processing flag from IC card 130 to change the display state of display 132 to the state in which nothing is displayed (the state of FIG. 3) (S16 and S37). Then CPU 121 returns to Step S201.

In Step S205, when the instruction to release the remaining processing flag from IC card 130 is received from MFP 100 (NO in S205), CPU 121 determines whether an instruction to set the remaining processing flag to IC card 130 (S207). When the instruction to set the remaining processing flag to IC card 130 is received (YES in S207), CPU 121 sets the remaining processing flag to IC card 130 to display the characters of "existence of not-yet-written information" on display 132 (S23). Then CPU 121 returns to Step S201.

In Step S207, when the instruction to set the remaining processing flag to IC card 130 is not received from MFP 100 (NO in S207), CPU 121 determines whether an inquiry whether IC card 130 is placed on card reader 120 is received from MFP 100 (S209). When the inquiry whether IC card 130 is placed on card reader 120 is received from MFP 100 (YES in S209), CPU 121 checks whether IC card 130 is placed on card reader 120 and reply to MFP 100 (S30). Then CPU 121 returns to Step S201.

In Step S209, when the inquiry whether IC card 130 is placed on card reader 120 is not received from MFP 100 (NO in S209), CPU 121 returns to Step S201 to determine whether the user touches card reader 120 with IC card 130 again (S201).

Effect of Embodiment

In the log information management system of the embodiment, the remaining processing flag read from the IC card of the user is checked during the IC card authentication, the writing of the log information (remaining processing) is regarded to be not ended when the remaining processing flag is set, the log information remaining in the management server is searched and written in the IC card, and the login processing is executed after the writing of the remaining log information is completed. When the remaining processing flag is not set, the writing of the log information is regarded to be ended, and the login processing is directly executed. When the writing of the log information in the IC card is completed, the remaining processing flag in the IC card is released. After the login, the remaining processing flag of the user is set to the IC card.

According to the log information management system of the embodiment, the remaining processing flag is set after the login. Therefore, even if the IC card is not held on the card reader until the job history is fixed, the log information such as the job history and the billing information can securely be written in the IC card by the remaining processing flag when the card reader senses the IC card next time. As a result, the user-friendliness of the log information management system is improved.

The configuration in which the IC card is held can be removed, which eliminates the large, expensive card reader and card writer. The server that manages the billing information can also be removed. As a result, the enlargement of the system can be suppressed.

When the IC card is sensed while the remaining processing flag is set, the previous job history is written in the IC card, so that the previous job history can securely be written in the IC card before the login.

The log information written in the IC card from the log information table is deleted after the writing of the log information in the IC card is completed, so that the amount of data of the log information table to be stored can be suppressed.

The IC card includes the display that can change the display state according to the existence or non-existence of the setting of the remaining processing flag, so that the user can learn whether the writing of the log information is completed from the display state of the display. Particularly, in the case that the electronic money can be saved in the IC card, the user can learn whether the unsettled usage charge exists from the display state of the display. Therefore, the user easily estimates the balance of the electronic money saved in the IC card, and the user can login to the MFP after saving the electronic money in the IC card when the balance is estimated to be little. As a result, the user-friendliness of the log information management system can be improved.

Other

In the above embodiment, the log information is written in the IC card. However, at least some sort of job information may be written in the IC card, and any kind of job information may be written in the IC card. For example, the log information written in the IC card may include the authentication result (successful or fail) of the IC card, the job history (how many pages are transmitted to which destination by which function), and the billing information (usage charge) that becomes clear after the job is ended. A magnetic card in which the information is magnetically stored may be used as the information storage medium instead of the IC card. A mobile phone, a personal digital assistance, a USB memory, and a memory card may be used as the information storage medium.

The log information table and the ID information table may be stored anywhere. For example, as illustrated in FIG. 18, the log information table and the ID information table may be stored in HDD 14 of MFP 100 instead of storing the log information table and the ID information table in HDD 114 of management server 110. In this case, the management server may be eliminated. Therefore, because the operations of the management server, such as the authentication of the card ID and the treatment of the log information, can be performed in MFP 100, the network communication between the management server 110 and MFP 100 is eliminated, and MFP 100 can rapidly be operated.

Figure 19:
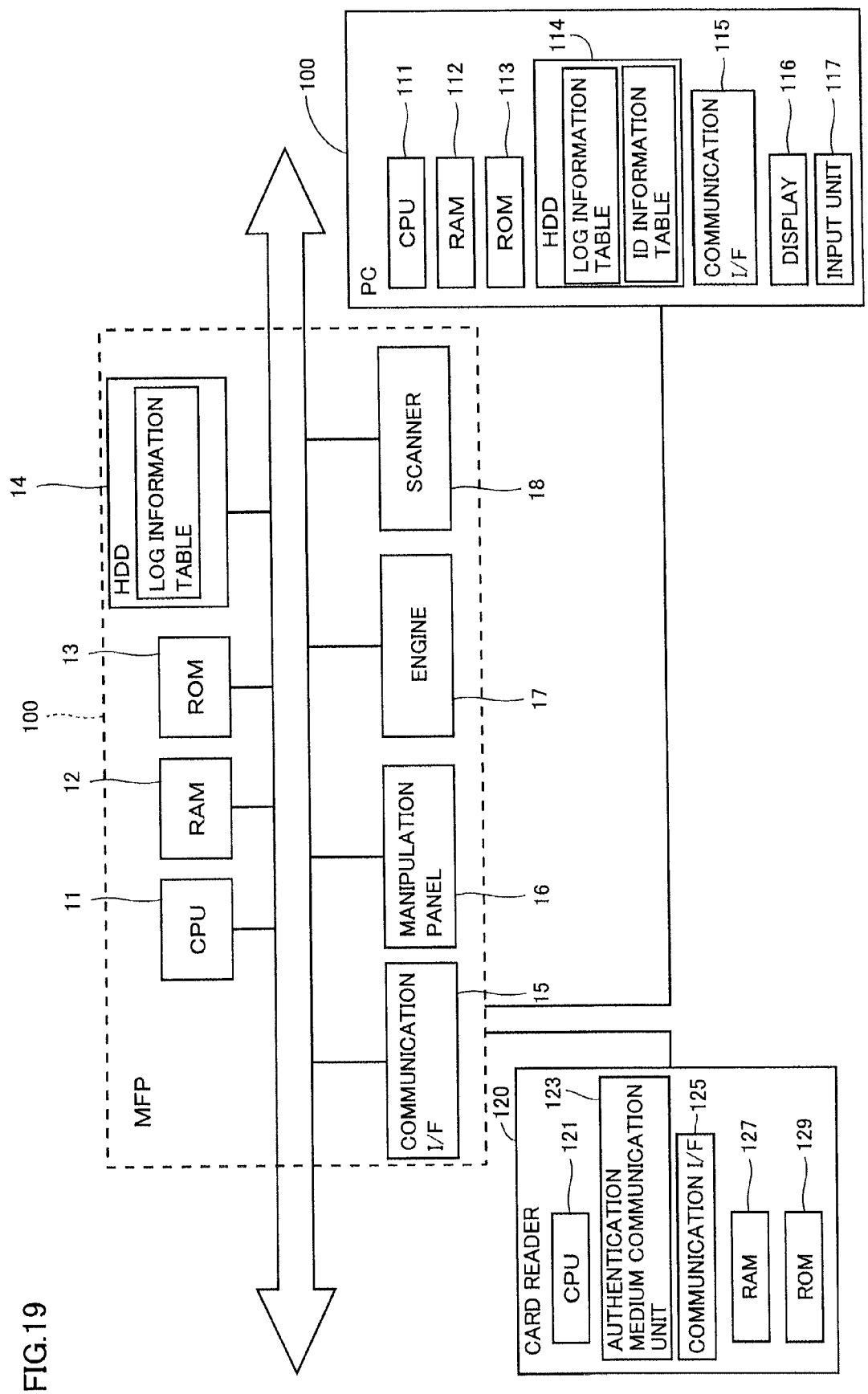
FIG. 19 is a block diagram illustrating a configuration of a log information management system according to a second modification of the embodiment.

As illustrated in FIG. 19, for example, the log information is managed (stored) by the log information tables of both HDD 114 of management server 110 and HDD 14 of MFP 100 until a given time elapses since the login time, and the log information in which the given time elapses may be deleted from the log information table of HDD 14 of MFP 100. Therefore, because the log information can be acquired in MFP 100 until the given time during which the user is supposed to be located close to MFP 100, the network communication that acquires the log information between the management server 110 and MFP 100 can be eliminated to rapidly perform the writing operation of the log information. The log information is also managed by HDD 114 of management server 110. Therefore, even if the user logins to another MFP 100, the user can acquire the log information from management server 110 to write the log information in IC card 130.

Figure 20:
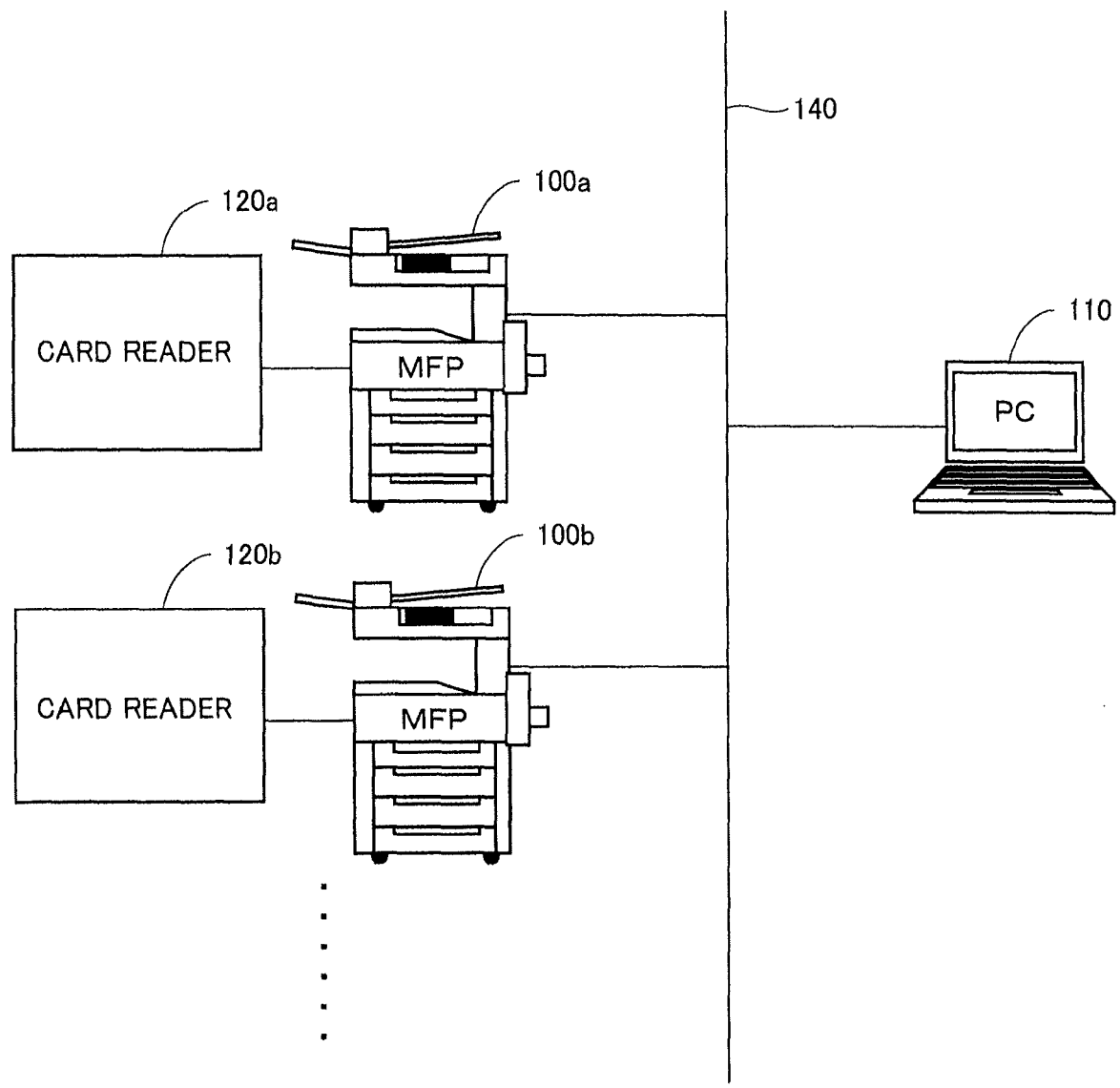
FIG. 20 is a block diagram illustrating a configuration of a log information management system according to a third modification of the embodiment.

As illustrated in FIG. 20, the log information management system includes plural MFPs 100a, 100b, ... and card readers 120a, 120b, ... that are connected to MFPs 100a, 100b, ... respectively, and each of MFPs 100a, 100b, ... may include a log information management apparatus. In this case, management server 110 can collectively manage the log information tables of MFPs 100a, 100b, ....

The log information management apparatus may be incorporated in management server 110 or card reader 120. As illustrated in FIG. 21, in the case that card reader 120 is directly connected to network 140 while the log information management apparatus and a billing processing device are incorporated in card reader 120, MFP 100 can conduct communication with a client PC 150 and management server 110 about the job and the like, and card reader 120 can conduct communication with management server 110 about the management of the log information and the billing processing.

In the embodiment, the log information management apparatus is included in the MFP. Instead of the MFP, the log information management system may be included in other image forming apparatus such as the facsimile machine, the copying machine, and the printer.

The log information is not deleted from the log information table after the writing, but the pieces of log information on all the performed jobs may be stored in the log information table. In this case, the login date and time is written in the card storage information when the remaining processing flag is set, the not-yet-written log information of the specific user may be searched based on the card ID stored in the IC card and the login date and time.

Any flag may be used as long as whether the remaining processing is ended can be determined from the outside. For example, the setting/release of the flag may be expressed by "1" and "0", or the setting/release of the flag may be expressed based on whether specific data is written. The state in which the specific data is not written may be set to the state in which the flag is set while the state in which the specific data is written is set to the state in which the flag is released.

The pieces of processing in the embodiment may be executed with software or a hardware circuit. A program that executes the pieces of processing in the embodiment can be provided, or the program may be provided to the user while recorded in recording mediums such as a CD-ROM, a flexible disk, a hard disk, a ROM, a RAM, and a memory card. The program is executed by a computer such as a CPU. The program may be downloaded to the apparatus through a communication line such as the Internet.

Accordingly, the embodiment can provide the log information management apparatus for the convenient image forming apparatus, the image forming apparatus, the method for controlling the log information management apparatus for the image forming apparatus, and the recording medium in which the control program of the log information management apparatus for the image forming apparatus is stored.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A log information management apparatus for an image forming apparatus, the log information management apparatus comprising:
an identification information acquisition unit to acquire identification information on a user from an information storage medium in which said identification information is stored; and
a processor configured to:
determine whether a flag is set in the information storage medium from which the identification information is acquired by said identification information acquisition unit after said identification information acquisition unit acquires the identification information, wherein the set flag indicates that a job history relating to processing by the user is stored in a storage device, and which job history has not yet been transferred to the information storage medium;
write the job history in the information storage medium in which said processor determined that the flag is set, the job history being stored by said storage device, said job history relating to the identification information acquired by said identification information acquisition unit;
release the flag after the job history in the storage device is written by said processor in the information storage medium;
set a flag indicating that new job processing relating to billing is not completed to said information storage medium from which the identification information is acquired by said identification information acquisition unit after the flag is released;
cause the image forming apparatus to perform a job after said flag setting unit sets the flag; and
store a job history performed by said image forming apparatus based on completion of a performance of a job.

2. The log information management apparatus for the image forming apparatus according to claim 1, wherein, when a job history a can be written in the information storage medium from which said identification information acquisition unit acquires the identification information after said image forming apparatus performs the job, said processor writes the job history in the information storage medium.

3. The log information management apparatus for the image forming apparatus according to claim 1, wherein said history storage stores the job history after performance of the job of said image forming apparatus job is completed.

4. The log information management apparatus for the image forming apparatus according to claim 1, wherein the processor is further configured to delete the job history, in which writing is completed, from a content stored in the history storage after said processor completes writing of the job history.

5. The log information management apparatus for the image forming apparatus according to claim 1, wherein said information storage medium includes a display to be able to change a display state, and said processor is further configured to change said display state of the display according to setting or release of the flag.

6. The log information management apparatus for the image forming apparatus according to claim 1, wherein the job history written by said processor includes billing information on the job.

7. The log information management apparatus for the image forming apparatus according to claim 1, wherein said storage device stores the job history in a storage device of a management server connected to said image forming apparatus through a communication line.

8. The log information management apparatus for the image forming apparatus according to claim 1, wherein said storage device stores a job history in a storage device provided in said image forming apparatus.

9. An image forming apparatus comprising:
said log information management apparatus for the image forming apparatus according to claim 1; and
a performance unit that performs a job in response to an instruction from said processor.

10. A method for controlling a log information management apparatus for an image forming apparatus, the method comprising:
an identification information acquisition step of acquiring identification information on a user from an information storage medium in which the identification information is stored;
a determination step of using a processor to determine whether a flag is set in the information storage medium from which the identification information is acquired in said identification information acquisition step after the identification information is acquired in said identification information acquisition step, wherein the set flag indicates that a job history relating to processing by the user is stored in the storage device, and which job history has not yet been transferred to the information storage medium;
a history storing step of using the processor to cause a storage device to store a job history performed by said image forming apparatus based on completion of the performance of a job;
a history writing step of using the processor to write the job history in the information storage medium in which the flag is determined to be set in said determination step, the job history being stored in said history storage step, said job history relating to the identification information acquired in said identification information acquisition step;
a flag releasing step of using the processor to release the flag set in said flag setting step after the job history is written in said history writing step;
an executing step of executing login processing after the flag is released;
a flag setting step of setting a flag indicating that processing relating to billing is not completed to said information storage medium from which the identification information is acquired by said identification information acquisition unit after login processing; and
a job performing step to cause the image forming apparatus to perform a next job after said flag setting unit sets the flag.

11. A non-transitory computer-readable medium storing a control program of a log information management apparatus for an image forming apparatus, said control program causing a computer to execute processing comprising the steps of:
an identification information acquisition step of acquiring identification information on a user from an information storage medium in which the identification information is stored;

a determination step of using a processor to determine whether a flag is set in the information storage medium from which the identification information is acquired in said identification information acquisition step after the identification information is acquired in said identification information acquisition step, wherein the set flag indicates that a job history relating to processing by the user is stored in the storage device, and which job history has not yet been transferred to the information storage medium;

a history storing step of using the processor to cause a storage device to store a job history performed by said image forming apparatus based on completion of the performance of a job;

a history writing step of using the processor to write the job history in the information storage medium in which the flag is determined to be set in said determination step, the job history being stored in said history storage step, said job history relating to the identification information acquired in said identification information acquisition step;

a flag releasing step of using the processor to release the flag set in said flag setting step after the job history is written in said history writing step;

an executing step of executing login processing after the flag is released;

a flag setting step of setting a flag indicating that processing relating to billing is not completed to said information storage medium from which the identification information is acquired by said identification information acquisition unit after login processing; and a job performing step to cause the image forming apparatus to perform a next job after said flag setting unit sets the flag.

\* \* \* \* \*